United States Patent
Parker et al.

(10) Patent No.: US 7,218,800 B2
(45) Date of Patent: May 15, 2007

(54) COMPENSATOR FOR POLARIZATION-MODE DISPERSION COMPENSATION

(75) Inventors: Michael C. Parker, Colchester (GB); Stuart D. Walker, Colchester (GB)

(73) Assignee: Fujitsu Limited, Kawasaki (JP)

( * ) Notice: Subject to any disclaimer, the term of this patent is extended or adjusted under 35 U.S.C. 154(b) by 74 days.

(21) Appl. No.: 10/491,357

(22) PCT Filed: Sep. 27, 2002

(86) PCT No.: PCT/GB02/04391

§ 371 (c)(1), (2), (4) Date: Mar. 26, 2004

(87) PCT Pub. No.: WO03/030410

PCT Pub. Date: Apr. 10, 2003

(65) Prior Publication Data

US 2005/0002594 A1    Jan. 6, 2005

(30) Foreign Application Priority Data

Sep. 28, 2001    (GB) ................... 0123428.5

(51) Int. Cl.
G02B 6/26    (2006.01)
G02B 6/34    (2006.01)
G02B 6/00    (2006.01)
G02F 1/01    (2006.01)

(52) U.S. Cl. ............... 385/11; 385/1; 385/37; 398/81

(58) Field of Classification Search ............. 385/11, 385/27, 37; 398/81, 29, 147
See application file for complete search history.

(56) References Cited

U.S. PATENT DOCUMENTS

| | | | |
|---|---|---|---|
| 5,587,827 A | 12/1996 | Hakimi et al. | 359/249 |
| 6,271,952 B1 | 8/2001 | Epworth | 359/161 |
| 6,317,240 B1 | 11/2001 | Penninckx et al. | 359/161 |
| 6,604,871 B2 * | 8/2003 | Cao | 398/158 |
| 6,701,204 B1 | 3/2004 | Nicholson | |
| 6,710,904 B1 | 3/2004 | Penninckx et al. | |
| 2004/0096217 A1 * | 5/2004 | Parker et al. | 398/39 |

(Continued)

FOREIGN PATENT DOCUMENTS

EP    1087245 A2    9/2000

(Continued)

OTHER PUBLICATIONS

International Search Report in International Application No. PCT/GB 02/04391, dated May 8, 2003, 3 pages.

(Continued)

*Primary Examiner*—Michelle Connelly-Cushwa
(74) *Attorney, Agent, or Firm*—Baker Botts L.L.P.

(57) ABSTRACT

A compensator for compensating polarisation-mode dispersion, comprises a splitter (30) arranged to split light, according to the light's polarisation, between a first optical path and a second optical path; a combiner (40) arranged to combine light from the first optical path and the second optical path, and a monitor (15) for monitoring the light. An active wavelength-delay device (70) is provided in the first optical path and arranged such that components of the light travelling in the first optical path and having different wavelengths are subjected to different delays, the delays being selected according to an output from the monitor (15).

26 Claims, 10 Drawing Sheets

U.S. PATENT DOCUMENTS

2004/0101239 A1* 5/2004 Parker .................. 385/37

FOREIGN PATENT DOCUMENTS

| EP | 1041753 A1 | 10/2000 |
|---|---|---|
| EP | 1067715 A1 | 1/2001 |
| EP | 1087245 A2 | 3/2001 |
| EP | 1133086 A2 | 9/2001 |
| JP | 2001-44937 | 2/2001 |
| JP | 2003-143088 | 5/2003 |
| WO | WO 01/61385 A2 | 8/2001 |

OTHER PUBLICATIONS

M.C. Parker et al., "Applications of Active Arrayed-Waveguide Gratings in Dynamic WDM Networking and Routing", Journal of Lightwave Technology, vol. 18, No. 12, pp. 1749-1756, Dec. 2000.

J.P. Gordon and H. Kogelnik, "PMD Fundamentals: Polarization Mode Dispersion in Optical Fibers", PNAS, vol. 97, No. 9, pp. 4541-4550, Apr. 25, 2000.

C Francia et al., "PMD Second-Order Effects on Pulse Propagation in Single-Mode Optical Fibers", IEEE Photonics Technology Letters, vol. 10, No. 12, Dec. 1998.

R.E. Schuh et al., "Polarization Mode Dispersion in Spun Fibers with Different Linear Birefringence and Spinning Parameters", Journal of Lightwave Technology, vol. 16, No. 9, pp. 1583-1588, Sep. 1998.

P. Ciprut et al., "Second-Order Polarization Mode Dispersion: Impact on Analog and Digital Transmissions", Journal of Lightwave Technology, vol. 16, No. 5, pp. 757-771, May 1998.

F. Heismann et al., "Automatic Compensation of First-Order Polarization Mode Dispersion in a 10 Gb/s Transmission System", Bell Labs, Lucent Technologies, USA, 2 pages.

M. Karlsson et al., "Higher Order Polarization Mode Dispersion Compensator with Three Degrees of Freedom", Photonics Laboratory, Department of Microelectronics, Chalmers University of Technology, Sweden, 3 pages.

Henning Bülow, "PMD Mitigation Techniques and Their Effectiveness in Installed Fiber", Alcatel Corporate Research Center, Stuttgart, Germany, 4 pages.

* cited by examiner

COMPENSATOR FOR POLARIZATION-MODE DISPERSION COMPENSATION

CROSS REFERENCE TO RELATED APPLICATIONS

This application claims priority under 35 U.S.C. §119 of PCT application number PCT/GB02/04391 filed Sep. 27, 2002, entitled "A Compensator for Polarisation-Mode Dispersion Compensation" which claims priority to British application number 0123428.5 filed Sep. 28, 2001 and entitled "A Compensator for Polarisation-Mode Dispersion Compensation".

This invention relates to the field of optical network devices, in particular compensators for polarisation-mode dispersion (PMD).

Telecommunications systems are increasingly being implemented using optical networks involving long-distance, high-bit-rate optical-fibre links. PMD is expected to become a significant problem in such optical networks as bit-rates move up to and beyond 40 Gb/s. Whilst recently developed spun-fibre technology mitigates the worst effects of PMD, existing fibre links will require compensation.

PMD is one of a number of forms of dispersion; that is, it is one of a number of mechanisms that can cause different components of light to travel at different speeds and that hence can break up a signal encoded on that light. Material dispersion (caused by a variation, with wavelength, of the refractive index of the material of which a fibre is made) and waveguide dispersion (caused by a variation, with wavelength, of the distribution of a light signal in the transverse cross-section of an optical fibre) are examples of other forms of dispersion (both are examples of chromatic dispersion, because they are wavelength-dependent effects).

PMD results from residual birefringence in single-mode optical fibres, such as those used in the telecommunications industry. In general; in a birefringent material, two orthogonal axes can be identified. Those two axes are referred to as 'fast' and 'slow' axes because light linearly polarised along those axes travels fastest and slowest, respectively, than light polarised along any other axis. When a pulse of light of an arbitrary polarisation enters a birefringent material, it splits into two components that travel along the fast and slow axes. The pulse therefore spreads in time and may split completely into two pulses if it propagates a sufficient distance in the material.

Although single-mode fibres are so called because they support only a single transverse mode, such fibres may support two polarisation modes because the fibres generally exhibit some residual birefringence. Although the birefringence of single-mode fibre is relatively weak, its effects are significant over the distances involved in telecommunications applications, which may be many kilometres. The birefringence may vary in its magnitude and in the direction of its axes along the length of the fibre, but overall principal states of polarisation (PSPs) may be identified, for a particular fibre at a particular time, which are the fast and slow axes for propagation in the fibre. However, environmental fluctuations generally cause the orientation of the PSPs, and the difference in time delay between them, to fluctuate with time and wavelength. Active compensation is therefore required to take into account variations in the PSPs.

The time difference between the two polarisation components is called the differential group delay (DGD). It is the 'first-order' PMD effect.

In a known compensator for compensating first-order PMD (FIG. 1), a light pulse travels from an optical fibre into a dispersion compensation module (DCM) 10, in which chromatic dispersion (e.g. material dispersion) is compensated. Next, the pulse travels to a polarisation controller 20. A polarisation controller is an active element that transforms the time-varying PSPs of input light into the fixed principal polarisation axes of a compensation device in such a way that the fast PSP of input light is transformed onto the slow axis of the compensation device and vice versa. Polarisation control may be achieved by the provision of two quarter-wave plates and a variable birefringence. In practice, a polarisation controller typically comprises three loops of optical fibre (looping the fibre causes stresses and hence refractive index changes in the fibre). Each loop acts as a quarter-wave plate and the birefringence of the controller may be adjusted by twisting the loops out of the plane in which they lie. (The device thus has redundant degrees of freedom).

Next, the pulse is split into its polarisation components by a polarisation beam splitter 30. The polarisation components are recombined at a second polarisation beam splitter 40. Between the two beam splitters 30, 40, each light pulse travels along a first or a second optical path, according to the light's polarisation. The 'fast' component (that is the component of the light signal that is leading the corresponding component having the opposite polarisation) passes through an active group-delay element arranged in the first optical path, whilst the other passes though a fixed delay (that is, the second optical path has a fixed path length). A basic active group-delay element comprises a pair of fixed mirrors 50 that reflect the polarisation component to and from a movable mirror 60. The polarisation of light output from the compensation device is monitored by a monitor 65 and the moveable mirror 60 is moved so that path length traversed by the polarisation component that is reflected by the mirror 60 is the correct length to cancel out the effects of DGD. The active group-delay device thus provides a group-delay to light passing along the first optical path relative to light passing along the second optical path, the group-delay being dependent upon an output from the monitor; thus a feedback loop enables correction of first-order DGD on a millisecond time scale.

However, the DGD and the orientation of the PSP each themselves vary with wavelength. That variation leads to 'second-order' PMD effects. A pulse contains light of a band of wavelengths and so, in a fibre exhibiting second-order PMD, each wavelength component experiences a different delay and a different depolarisation, which can lead to pulse distortion. Although those effects are generally less strong than the first-order effect, when the DGD is compensated, second-order effects become the dominant limit on performance.

The phenomenon of PMD may be described mathematically as follows. Using the notation employed by C. Francia et al. [in 'PMD second-order effects on pulse propagation in single-mode optical fibres', IEEE Photonics Tech. Lett., vol. 10(12), pp. 1739–1741, 1998], the 3D Poincaré representation of the PMD vector $\vec{\Omega}(\omega)$ up to second-order in a Taylor expansion is given by:

$$\vec{\Omega}(\omega) = \Delta\tau_0 \hat{s}_0 + \left( \frac{\partial \hat{s}}{\partial \omega} \Delta\tau_0 + \frac{\partial \Delta\tau}{\partial \omega} \hat{s}_0 \right) \Delta\omega \qquad (1)$$

where $\hat{s}_0$ represents the direction of one of the two PSPs of an input fibre and $\Delta\tau_0$ is the first-order differential group delay at frequency $\omega$ between those two PSPs.

$$\frac{\partial \hat{s}}{\partial \omega}$$

and $$\frac{\partial \Delta\tau}{\partial \omega}$$

are, respectively, the rates of change with frequency $\omega$ of the PSP direction and the differential group delay, evaluated at the central frequency of the input light signal. $\Delta\omega$ is frequency displacement from the nominal centre frequency of the wavelength channel.

The first term of the right-hand side of equation (1) represents the first order polarisation-mode dispersion. The second and third terms each represent forms of second-order polarisation-mode dispersion. The second term is a depolarisation (that is a variation of the polarisation direction with wavelength), whereas the third term is a chromatic dispersion (that is a variation of the group delay with wavelength).

An object of the invention is to provide a compensator for, and a method of, compensating first-order PMD and at least partially compensating for second-order PMD.

According to the invention there is provided a compensator for compensating polarisation-mode dispersion, comprising: a splitter arranged to split light, according to the light's polarisation, between a first optical path and a second optical path; a combiner arranged to combine light from the first optical path and the second optical path, and a monitor for monitoring the light; characterised in that the apparatus comprises an active wavelength-delay device arranged in the first optical path such that components of the light travelling in the first optical path and having different wavelengths are subjected to different delays, the delays being selected according to an output from the monitor.

Preferably, the active wavelength-delay device is arranged to compensate for chromatic dispersion due to second-order polarisation-mode dispersion. Equation (1) may be re-written as:

$$\vec{\Omega}(\omega) = \Delta\tau_0 \left( \hat{s}_0 + \frac{\partial \hat{s}}{\partial \omega} \Delta\omega \right) + \Delta\omega \frac{\partial \Delta\tau}{\partial \omega} \hat{s}_0 \quad (2)$$

$$\approx \Delta\tau_0' \hat{s}_0' + \Delta\omega \frac{\partial \Delta\tau}{\partial \omega} \hat{s}_0$$

The first term of the right-hand side of Equation (2) represents a differential group delay on a slightly rotated PSP vector $\hat{s}_0'$, while the second term is unchanged from Equation (1) and is the chromatic dispersion on the original PSP vector $\hat{s}_0$. We may define $\hat{s}_0'$ as the centroidal PSP given by:

$$\hat{s}_0' = \frac{\int_{\omega_r}^{\omega_b} \hat{s}_0 \, d\omega}{\omega_b - \omega_r} \quad (2a)$$

Alternatively, we may define the quantity $\Delta\tau_0'\hat{s}_0'$ as being the weighted centroidal PSP (weighted according to the relative time delays for each frequency):

$$\Delta\tau_0'\hat{s}_0' = \frac{\int_{\omega_r}^{\omega_b} \Delta\tau_0 \hat{s}_0 \, d\omega}{\omega_b - \omega_r} \quad (2b)$$

The first term of Equation (2) dominates. It may be compensated for by a separate group-delay device in combination with the compensator. Preferably, however, the compensator further comprises an active group-delay device arranged in the first or second optical path, wherein the active group-delay device provides a group delay to light passing along the first optical path relative to light passing along the second optical path. Preferably, the group delay is dependent upon an output from the monitor. The compensator may thus be arranged such that it provides compensation in respect of the first term by active adjustment of the active group-delay device (which provides a variable group delay).

In contrast to prior art devices, however, the compensator may also be arranged such that it provides at least partial compensation in respect of the second term by active adjustment of the device that provides wavelength-dependent delays. The degree of compensation in respect of the second term depends upon the amount of depolarisation of $\hat{s}_0$ relative to $\hat{s}_0'$. Thus the compensator may be arranged to compensate actively, using the group-delay device, for first-order PMD (the first term of the right-hand side of Equation (1)) and group delays due to the second-order PMD effect, depolarisation, (the second term on the right-hand side of Equation (1)), together represented by the first term of Equation (2). The compensator may be arranged to ameliorate the second-order PMD effect, chromatic dispersion, represented by the third term of Equation (1), which is the second term of Equation (2), by using the active wavelength-delay device.

The monitor may monitor the light at any suitable point, for example, upstream of the splitter and/or downstream of the combiner.

Preferably, the active wavelength-delay device is arranged so that the components having the different wavelengths are subjected to delays that vary quadratically with wavelength, so that a linear frequency chirp is imparted to the light, the magnitude of the chirp being actively variable.

The active wavelength-delay device may be any suitable active chromatically dispersive device; for example, it may be a chirped fibre Bragg grating, a lattice filter (a cascade of Mach-Zehnder interferometers) or a cascaded ring resonator. The active group-delay device is a device that provides a uniform group delay that can be actively varied in response to changes in the output from the monitor. It may be arranged at any point in the compensator; for example, it may be an electro-optically or thermo-optically adjustable region in the first or second optical path.

Preferably, the compensator comprises an arrayed-waveguide grating (AWG), comprising an active region that is the active wavelength-delay device.

More preferably, the AWG comprises a second active region that is the active group-delay device.

Light input into the compensator will generally have PSPs that vary in time. In contrast, the compensator has fixed principal polarisation axes. Preferably, the compensator further comprises a polarisation controller. The polarisation controller may transform the light so that it is polarised with $\hat{s}_0'$ along one of the fixed axes of the compensator.

Preferably, the compensator comprises a further active wavelength-delay device arranged upstream or downstream of the splitter. Preferably, the further active wavelength delay device is arranged to provide wavelength-dependent delays selected according to the output from the monitor. Preferably, the compensator further comprises an active wavelength-delay device arranged in the second optical path, such that components of the light travelling in the second optical path and having different wavelengths are subjected to different delays. Preferably, the delays are selected according to the output from the monitor. Preferably, the active-wavelength-delay devices arranged in the first and second optical paths subject components of light travelling in their respective paths to wavelength-dependent delays having opposite signs.

The compensator may further comprise at least one pair of active wavelength-delay devices, one device of each pair being in the first optical path and one in the second optical path, the pair being arranged to compensate third- or higher-order chromatic dispersion due to polarisation mode dispersion.

Also according to the invention there is provided a method of compensating polarisation-mode dispersion in a light signal, comprising inputting the light into a compensator, monitoring an indicator indicative of polarisation-mode dispersion on the light, directing a first polarised component of the light along a first optical path, directing a second, differently polarised, component of the light along a second optical path, and recombining the polarised components from the first and the second optical paths, characterised in that the method includes the step of delaying different wavelengths of the light travelling in the first optical path by different amounts that are dependent upon the monitored indicator.

Preferably, the method includes the step of introducing a group-delay to the component passing along the first optical path relative to the component passing along the second optical path, the group delay being dependent upon the monitored output.

The monitoring may be carried out at any suitable stage in the method.

Preferably, the method includes the step of delaying different wavelengths of the light travelling in the second optical path by different amounts that are dependent upon the monitored indicators.

Preferably, the method includes the step of adjusting an active region, preferably of an AWG, to provide the group delay of the component passing along the first optical path. More preferably, the method includes the step of adjusting one or more active regions, preferably of an AWG, to provide the wavelength-dependent delays.

The second active region may be adjusted to provide a delay for compensating second-order chromatic dispersion. The method may further include the step of adjusting a further pair of active regions, one in the first optical path and one in the second optical path, to provide wavelength-dependent delays for compensating third- or higher-order dispersion.

Also according to the invention there is provided a compensator for compensating polarisation-mode dispersion, comprising: a splitter arranged to split light, according to the light's polarisation, between a first optical path and a second optical path; a combiner arranged to combine light from the first optical path and the second optical path; an active group-delay device, arranged in the first optical path, for delaying the light in the first optical path relative to the light in the second optical path; a monitor for monitoring chromatic polarisation-mode dispersion on the light; and an active wavelength-delay device arranged upstream or downstream of the splitter, components of the light having different wavelengths being subjected to different delays in the active wavelength-delay device, the different delays comprising delays selected to compensate chromatic dispersion in light entering the compensator, characterised in that the different delays further comprise delays selected according to an output from the monitor.

Preferably, the monitor is arranged upstream of the splitter. More preferably, the monitor is arranged downstream of the combiner.

Preferably, the active wavelength-delay device is arranged to provide compensation for a positively dispersed signal. As discussed above, a certain amount of negative dispersion may be tolerated. Preferably, however, the compensator further comprises a wavelength-delay device, arranged in the first or the second optical path, for providing compensation for a negatively dispersed signal. Also according to the invention there is provided a method of compensating polarisation-mode dispersion in a light signal, comprising: inputting the light into a compensator; splitting the light into a first polarised component and a second, differently polarised, polarised component; directing the first polarised component along a first optical path; directing the second component of the light along a second optical path; delaying the component passing along the first optical path relative to the component passing along the second optical path; recombining the polarised components from the first and the second optical paths; monitoring an indicator indicative of a chromatic-dispersion component of the polarisation-mode dispersion of the light; and delaying different wavelengths of the light, by different amounts, in order to compensate chromatic dispersion of the light that is input into the compensator, characterised in that the method further comprises delaying different wavelengths of the light by different amounts in order to compensate the chromatic-dispersion component of the polarisation-mode dispersion of the light indicated by the monitored indicator.

Embodiments of the invention will now be described, by way of example only, with reference to the drawings, of which:

Figure 1:
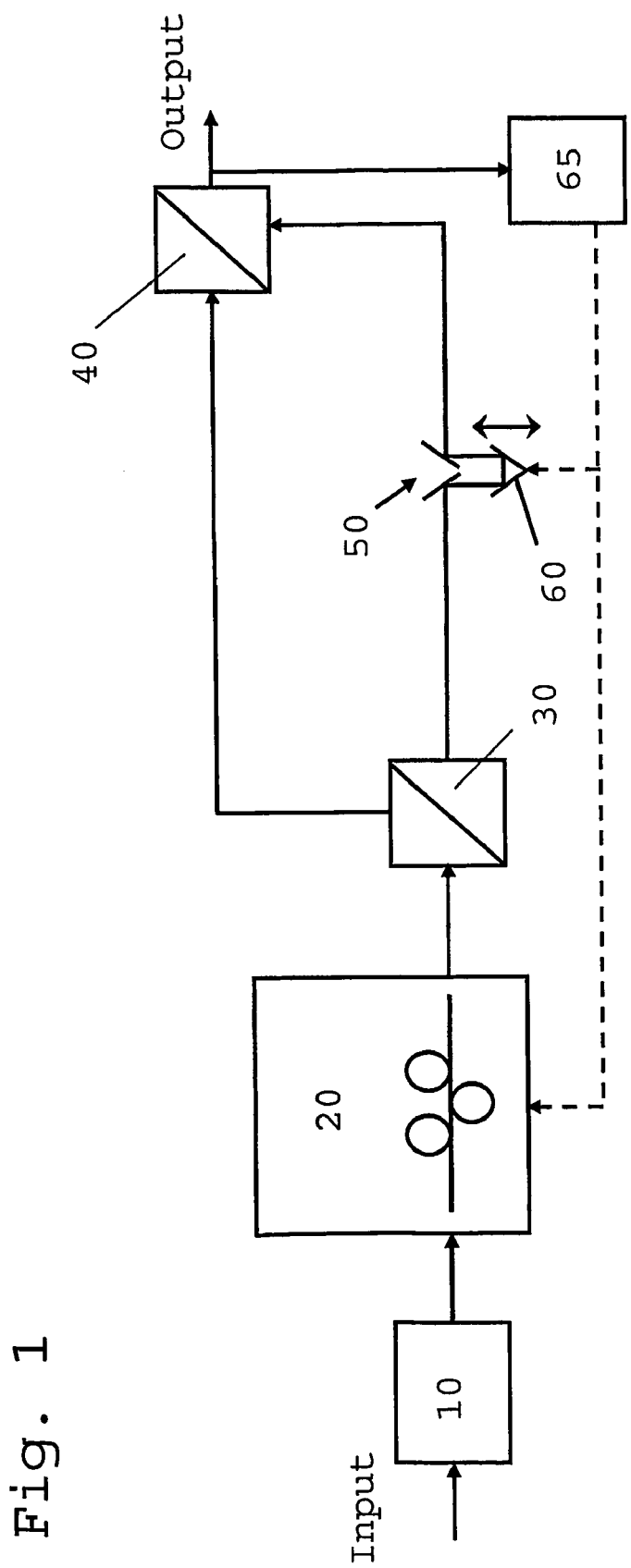
FIG. 1 is a schematic representation of a prior art first-order PMD compensator.

The prior-art device of FIG. 1 is described above.

AWGs are well known in the prior art. The AWG shown in FIG. 2 comprises fibre 80, free-propagation regions 90 and 130, waveguide array 100, rectangular active region 110, and parabolic active region 120.

The free propagation regions 90 and 130, one on the input side and one on the output side of the AWG, are thus interconnected by an array of M+1 waveguiding channels, in sequence m=0 to M, with the channels having gradually increasing path lengths, so that the geometric path length of the mth channel is greater than that of the (m−1)th channel. Light of wavelength spread in a single wavelength channel $\Sigma\lambda$ is transmitted along optical fibre 80 and then propagates through free-propagation region 90 until it reaches waveguide array 100. Free-propagation regions 90 and 130 are sufficiently long as to allow Fraunhofer diffraction to occur, which means that Fourier optical concepts can be employed in analysis of the AWG [M. C. Parker et al., *IEEE Journal of Special Topics in Quantum Electronics on Fibre-optic Passive Components*, Vol. 5(5), 1379 (1999)]. Waveguide array 100 can be regarded as a Fourier plane within the optical system.

The input light is distributed with a Gaussian intensity profile $$E_0 \exp\left[-\alpha\left(m - \frac{M}{m}\right)^2\right]$$

across the waveguides of array 100. Array 100 provides an overall complex apodisation function; that is, it affects both the phase and amplitude of the input light.

Active rectangular region 110 is a phase-control means used to impose across the array a programmable constant phase profile (that is a delay at all frequencies). The delay is variable by varying voltage $V_a$. The phase $\phi_{delay}$, applied equally to all wavelengths by the active region 110, is given by:

$$\varphi_{delay} = \frac{2\pi L}{\lambda_1} \Delta n(V_a) \qquad (3)$$

where L is the length travelled by light the active region 110, $\lambda_i$ is the centre wavelength of the pulse and $\Delta n(V_a)$ is the voltage controlled refractive-index change.

Active parabolic region 120 is a phase-control means that can be used to produce a programmable near- or sub-parabolic phase profile in the array 100 (which is the Fourier plane and so the phase profile is imparted to frequencies that are spatially distributed across the waveguide array 100); that results in a quasi-elliptical filter response (i.e., it results in a quasi-linear frequency chirp). The phase $\phi_{chirp}$ applied by the region 120 to light in the mth waveguide is variable by varying applied voltage $V_b$; it is given by:

$$\varphi_{chirp} = \left(\frac{1}{2} - \frac{m}{M}\right)^2 F(V_b) \qquad (4)$$

where $F(V_b)/4$ is the additional parabolic phase accumulated along the longest/shortest waveguides of the array, and is a maximum of $7\pi/5$ for maximum chromatic dispersion compensation. F is also the normalised chirp strength, equivalent to the parameter for a chirped fibre Bragg grating. Assuming an active length $L_M$ for the longest waveguide in the parabola, F is given by:

$$\frac{F(V_b)}{4} = \frac{2\pi L_M}{\lambda_i} \Delta n(V_b) \qquad (5)$$

Each of active regions 110, 120 may for example be a layer of hydrogenated amorphous silicon ($\alpha$-Si:H) for an AWG based on silicon technology or alternatively a thermo-optic region for an AWG based on silica. Alternatively, the regions may be embodied for example in the form of electrodes in an AWG based on indium phosphide or lithium niobate technology. It can be assumed that the phase shift imparted on a given waveguide will be proportional to the length of the channel segment over which the phase control means extends; hence, a parabolic phase shift is imparted by an active region having a length varying parabolically across the array 100 and a constant phase shift is imparted by an active region having a constant length across the array 100 (for example, a rectangular region).

The overall chirped-AWG spectral transmission response is given by [M. C. Parker et al., 'Applications of active AWGs in dynamic WDM networking and routing', Journal of Lightwave technology, vol. 18(12), pp. 1749–1756, 2000]:

$$t(\lambda) = \frac{-j\sqrt{\pi} rW}{\lambda R} e^{j\frac{2\pi L}{\lambda}\Delta n(V_a)} \sum_{m=0}^{M} e^{j\frac{2\pi \pi \Delta l}{\lambda}m + jF(V_b)\left(\frac{1}{2} - \frac{m}{M}\right)^2} \qquad (6)$$

where $\bar{n}$ is the average refractive index, $\Delta l$ is the incremental path length difference between neighbouring waveguides, r is the waveguide mode spot size, R is the length of the free-propagation region (FPR), W is the centre-to-centre distance between neighbouring waveguides at the FPR entrance, and there are M+1 waveguides in the AWG array. The local refractive index is given by $\bar{n}+\Delta n(V_a)$, where $\Delta n(V_a)$ is the voltage-controlled refractive index change, due to, for example, a thermo- or electro-optic effect.

Figure 2:
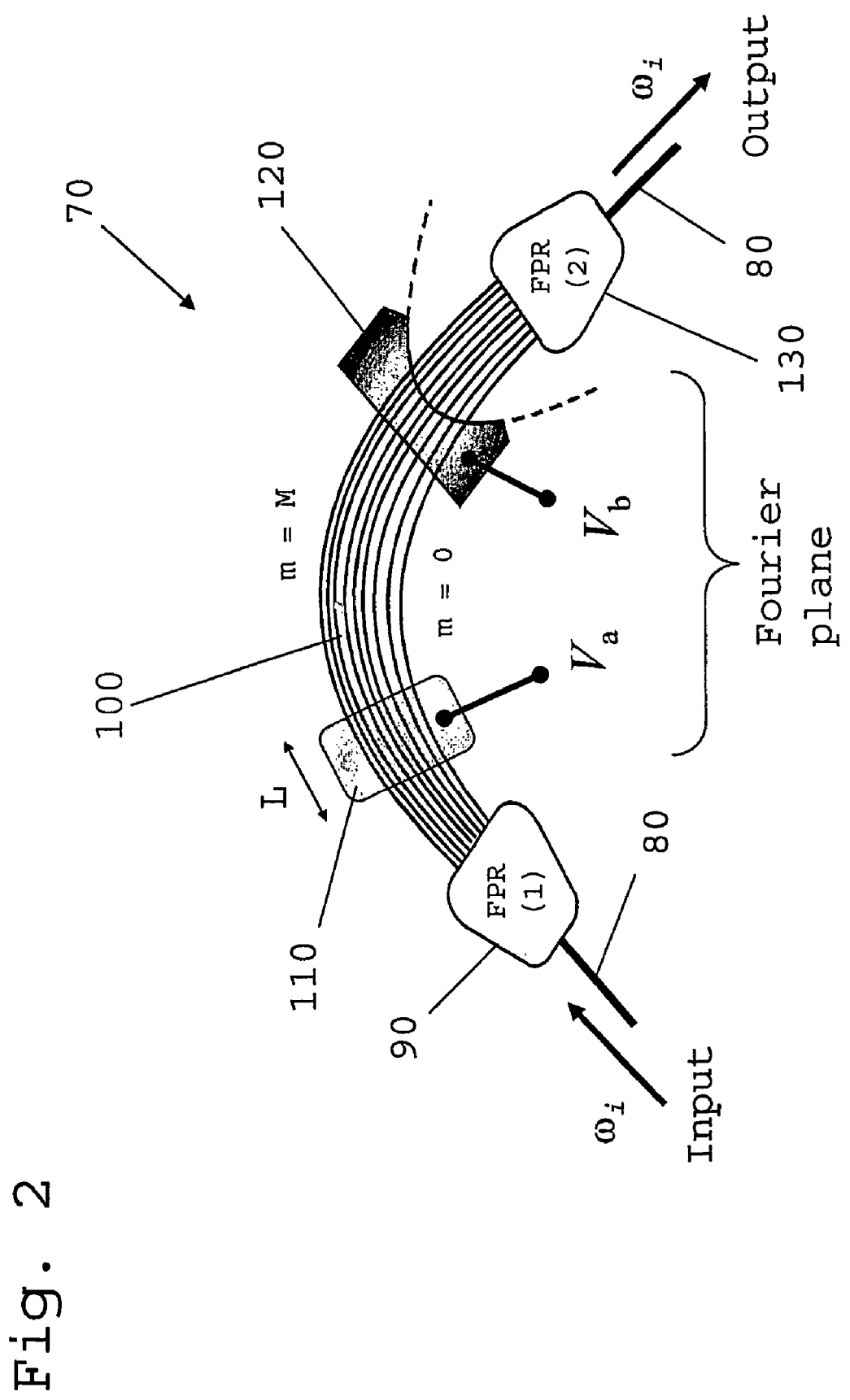
FIG. 2 is a schematic representation of an AWG.

The AWG of FIG. 2 thus provides a means of actively varying the time taken for a pulse to pass through it and also actively varying the time taken for individual wavelength components of the pulse to pass though the AWG.

In an embodiment of the invention (FIG. 3), operation of the compensator is identical to that of the prior art compensator shown in FIG. 1 and described above. However, instead of mirrors 50, 60, the group delay is provided by active rectangular region 110 of the AWG. The delay provided is:

$$\Delta\tau'_0 = \frac{L}{c} \Delta n(V_a) \qquad (7)$$

where $\Delta\tau_0'$ is the magnitude of the first term in Equation (2), the DGD on a rotated compensator PSP vector $\hat{s}_0'$. The delay may thus be controlled in response to changes in the DGD between the two polarizations by altering voltage $V_a$.

Figure 3:
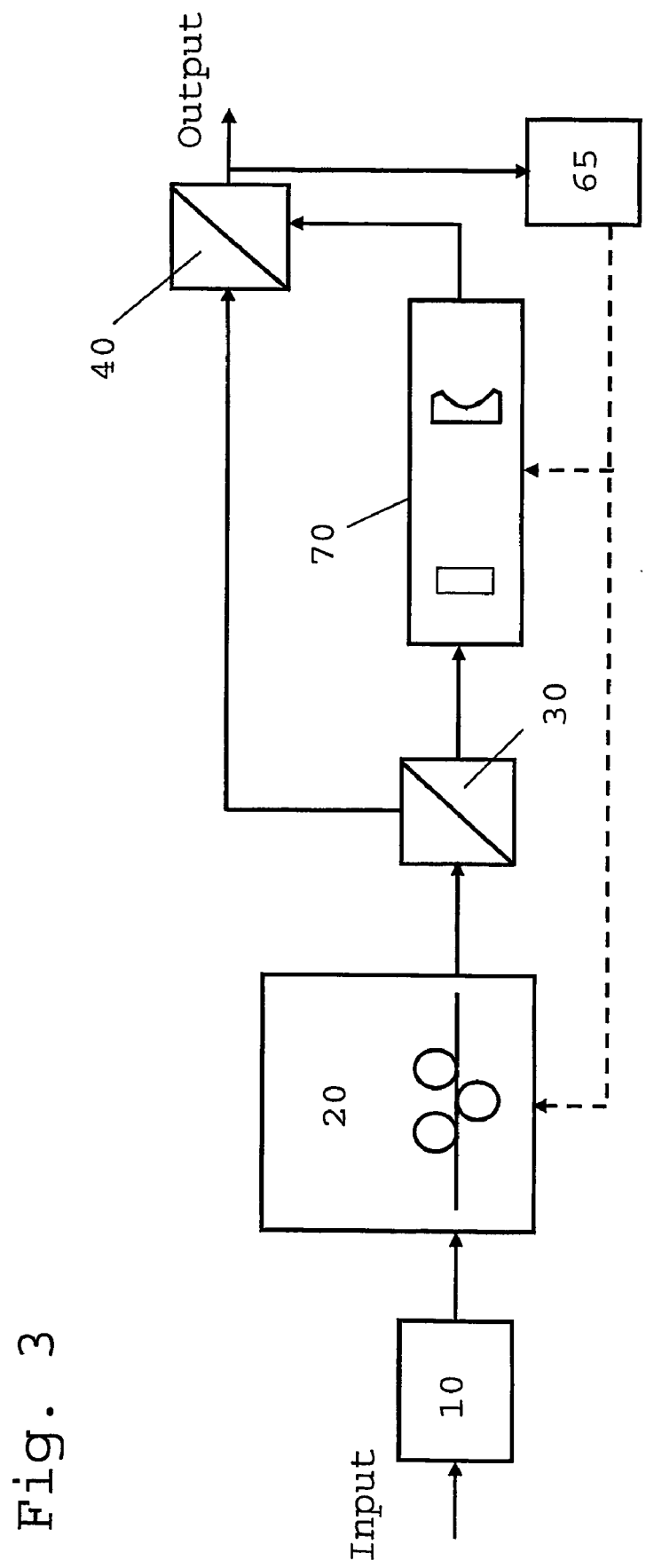
FIG. 3 is a schematic representation of a compensator according to the invention.

The device of FIG. 3 can also partially compensate for the second term of Equation (2), the chromatic dispersion on the original compensator PSP vector $\hat{s}_0$. The chromatic dispersion compensation provided by the AWG is given by:

$$\frac{\partial \Delta \tau}{\partial \omega} = \frac{1}{45}\left(\frac{M\bar{n}\Delta l}{c}\right)^2 \frac{2\pi L_M}{\lambda_1} \Delta n(V_b) \qquad (8)$$

Where $\Delta n(V_b)$ is the voltage-controlled refractive-index change in the parabolic region. Thus, the voltage $V_b$ may be adjusted to provide chromatic dispersion, although it is effectively applied along vector $\hat{s}_0'$ in Poincaré space, and so its effectiveness for compensation is dependent upon how far $\hat{s}_0$ is rotated from $\hat{s}_0'$.

Feedback allows active control of the modified group delay $\Delta \tau_0'$ and the residual chromatic dispersion $$\frac{\partial \Delta \tau}{\partial \omega}$$

on a millisecond timescale.

Figure 4:
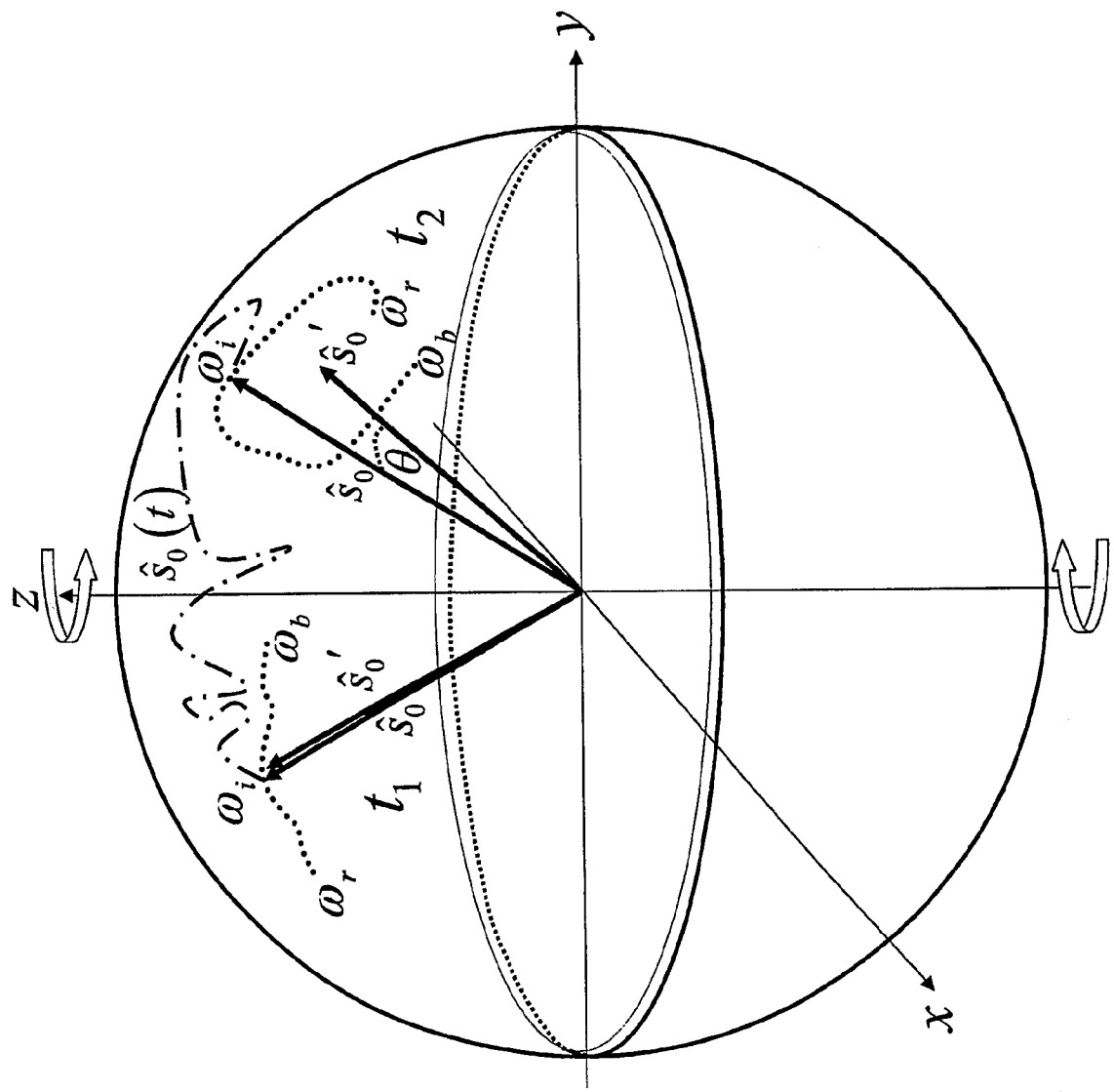
FIG. 4 is a Poincaré sphere showing Stokes vectors corresponding to light passing through the compensator of FIG. 3.

We note that for strong depolarisation, we expect the mismatch between the centroidal PSP $\hat{s}_0'$ and the actual PSP $\hat{s}_0$ at the other wavelengths in the pulse to manifest itself as an additional chromatic dispersion (to a first approximation) due to the combined action of the polarisation controller and the polarising beam splitter prior to the first optical path. That behaviour of the compensator may be better understood from a discussion of the underlying physics. The Poincaré sphere of FIG. 4 is a well-known representation of polarisation states of light. Every polarisation state is represented by a point having Stokes co-ordinates $(s_1, s_2, s_3)$; see Max Born & Emil Wolf, 'Principles of Optics', 6th (corrected) Edition, Pergamon Press, Oxford (1980), section 1.4.2 (pp. 24–32). The polarisation-state Stokes vector is the vector from the origin to that point. All possible linear polarisations are points on the equatorial circle, the north pole on the z-axis correspond to right-hand circular polarisations and the south pole on the z-axis correspond to left-hand circular polarisations. All other points on the surface correspond to polarisations having varying degrees of ellipticity. Points lying in planes parallel to the x-y plane (that is, lines of latitude on the sphere) correspond to polarisations of the same ellipticity but of different orientation. Points lying in planes perpendicular to the x-y plane that pass through the z-axis (that is, lines of longitude on the sphere) correspond to polarisations of the same orientation but of an ellipticity ranging from circular to linear and back to circular as one moves from pole to pole (because the phase difference between two orthogonal linear polarisation components forming the elliptical polarisation varies between $$-\frac{\pi}{2}$$

and $$+\frac{\pi}{2}$$

over that line of longitude).

One of the two orthogonal principal states of polarisation (PSP) at the carrier wavelength of light input into the compensator of FIG. 3 is shown as vector $\hat{s}_0$. The dash-dotted line $\hat{s}_0(t)$ is an example of the path of the random walk as a function of time of $\hat{s}_0$ on the surface of the Poincaré sphere.

Of course, the light signal is a pulse comprising a spread of wavelengths. Polarisation varies with frequency, and the locus of the spread, which itself varies with time, is shown as a dotted line on the surface of the Poincaré sphere in FIG. 4. Two such lines are shown, being "snap-shots" at times $t_1$ and $t_2$ of the randomly varying loci. The carrier wavelength is of frequency $\omega_i$, a red-end wavelength in the spread is of frequency $\omega_r$, and a blue-end wavelength is of frequency $\omega_b$.

Now, the polarisation controller 20 of the compensator of FIG. 3 transforms the polarisation of incoming light so that it is polarised along two orthogonal axes $\hat{s}_0'$ (one of which is shown in FIG. 4) which are the two axis of the polarisation beam splitter. $\hat{s}_0'$ is chosen to be the centroid of the loci of wavelengths at a given time. In general, there will be an angle $\theta$ between $\hat{s}_0$ and $\hat{s}_0'$ in the Poincaré sphere and that angle is related to the depolarisation between those vectors. Clearly, the more curved the locus, the further the centroid vector $\hat{s}_0'$ will be from the PSP vector $\hat{s}_0$ of the carrier wavelength (the centre wavelength of the locus, which is, by definition, on that locus, whereas the centroid in general is not).

Let us consider a case, $t_1$ in FIG. 4, where the frequency spread is very approximately linear on the surface of the Poincaré sphere. The centre wavelength, of frequency $\omega_i$, is nearly linearly polarised when it reaches beam splitter 30 because $\hat{s}_0$ is close to $\hat{s}_0'$, because the polarisation controller 20 is arranged to make it so. However, vectors to extreme wavelengths $\omega_r$ and $\omega_b$ make a significant angle $\theta$ with $\hat{s}_0'$, and the light at those wavelengths is therefore in general elliptically polarised when it reaches the beam splitter 30, because the polarisation controller 20 is not arranged to linearise the polarisation so as to be along those extreme vectors.

Now, the elliptically polarised light may be resolved into two orthogonal linear polarisation components (along orthogonal axes $\hat{s}_0'$) that are separated by a phase difference.

The Stokes vector to $\omega_r$ and the Stokes vector to $\omega_b$ are, in the near-linear case, on opposite sides of the vector $\hat{s}_0$ to the centre wavelength $\omega_i$. Light at $\omega_r$ and light at $\omega_b$ will tend to have phase differences of opposite sign between their polarisation components.

When the elliptically polarised light reaches the polarisation beam splitter 30, its linear components are split, with one lagging the other by the phase difference between them. We consider first the component at $\omega_r$ travelling along the first optical path, and say that it leads the centre-wavelength component at $\omega_i$ by some phase difference. The blue-end component at $\omega_b$ that also travels in that arm lags the centre wavelength component by some phase difference. Intermediate wavelengths also lead or lag relative to the centre wavelength by greater or lesser amounts according to the angle between their status vector and $\hat{s}_0'$.

The other polarisation component of each wavelength, which travels along the second arm, is similarly affected, but in the opposite sense (redder wavelengths lagging).

Thus, in passing through the polarisation controller 20 and beam splitter 30, light is split into two orthogonal, linearly polarised components (one in each arm of the compensator) which each has a spread of wavelengths that are delayed by different amounts relative to each other. In other words, two chromatically dispersed components result.

Now, the chromatic dispersion thus introduced is positive in one arm of the compensator and negative in the other. Negative dispersion in present day telecommunications systems tends to make pulses more compact and therefore a limited degree of it may be tolerated. Positive dispersion, on the other hand, tends to spread pulses, which can cause adjacent pulses to affect one another and is therefore bad. AWG 70 is provided to compensate for the dispersion in the arm having positively dispersed light.

However, it may be appropriate to compensate for the dispersion in both arms of the compensator. The compensator of FIG. 8, which appropriately compensates for positive and negative dispersion in the respective arms, is suitable for that.

The orientation of the locus through $\omega_r$, $\omega_i$ and $\omega_b$ relative to $\hat{s}_0'$ determines the nature of the introduced dispersion. If the locus passing from $\omega_r$ through $\omega_i$ to $\omega_b$ lies entirely on a line of latitude of the Poincaré sphere, then all frequencies have the same ellipsicity and hence the same phase difference between their orthogonal polarisation components. (The group delay and any chromatic dispersion of the two linear polarisation components that emerge from the beam-splitter will be the same and therefore can be compensated at the DCM 210). Thus the phase shift between the two polarisation components that emerge from the beam splitter 30 at a wavelength $\omega$ depends upon the difference between the z-components of the Stokes vector corresponding to that wavelength and $\hat{s}_0'$.

To determine the overall effect of passage through the polarisation controller 20 and polarisation beam splitter 30 on the phase profile of a light pulse, one must consider the difference in z-components between each point on the $\omega_r$-$\omega_b$ locus on the Poincaré sphere and $\hat{s}_0'$. It is possible to expand the resultant phase profile into components that correspond to group delay, group-delay dispersion, third-order dispersion and higher-order dispersions. The compensator of FIG. 8 will more completely compensate for group-delay and group-delay dispersion; the effectiveness of the compensation will depend, therefore, upon the relative significance of higher-order dispersions, which in turn depends on the nature of the locus. Of course, the nature of the locus is changing with time and hence so does the effectiveness of the compensation.

Some examples of alternative embodiments will now be described.

Figure 5:
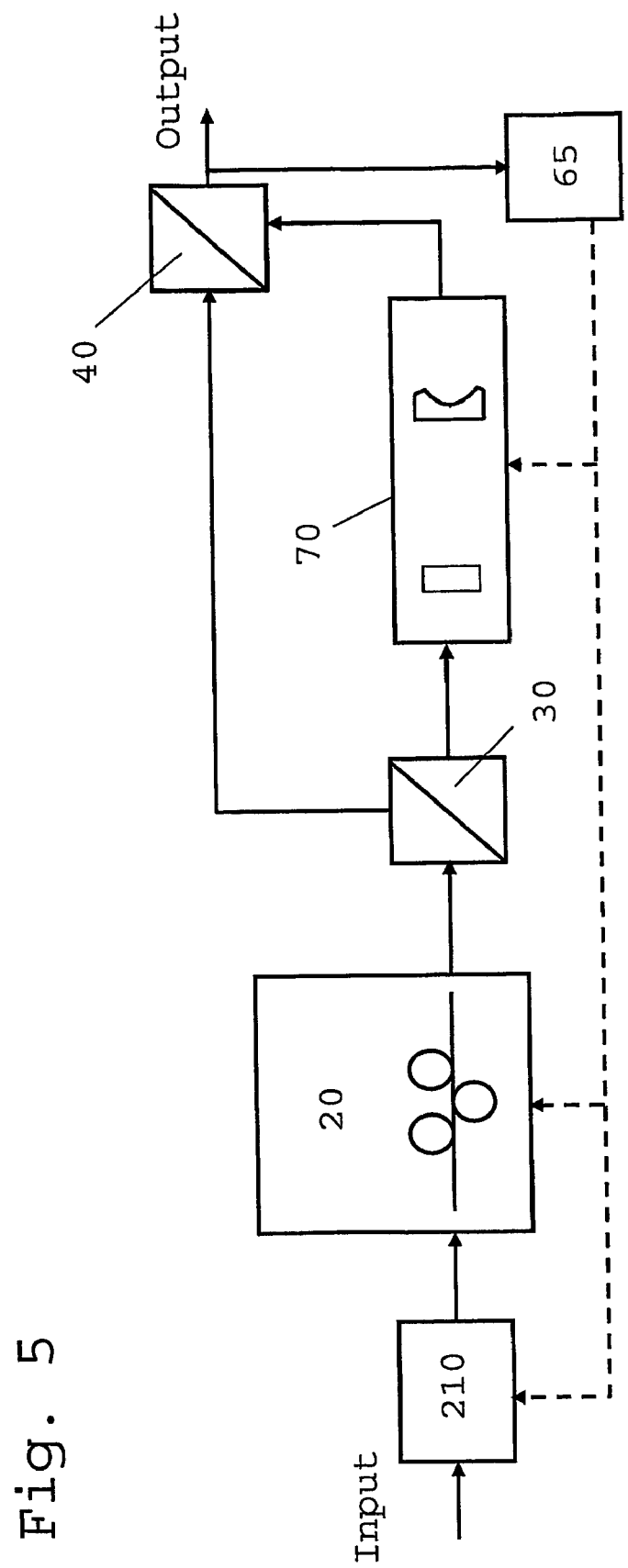
FIGS. 5 to 10 are compensators that are alternative embodiments of the invention.

The compensator of FIG. 5 is identical to that of FIG. 3, except that dispersion compensation module (DCM) 210 is controlled according to feedback from output monitor 65. DCM 210 is used as a dispersion compensator in conjunction with corrections achieved using AWG 70.

Figure 6:
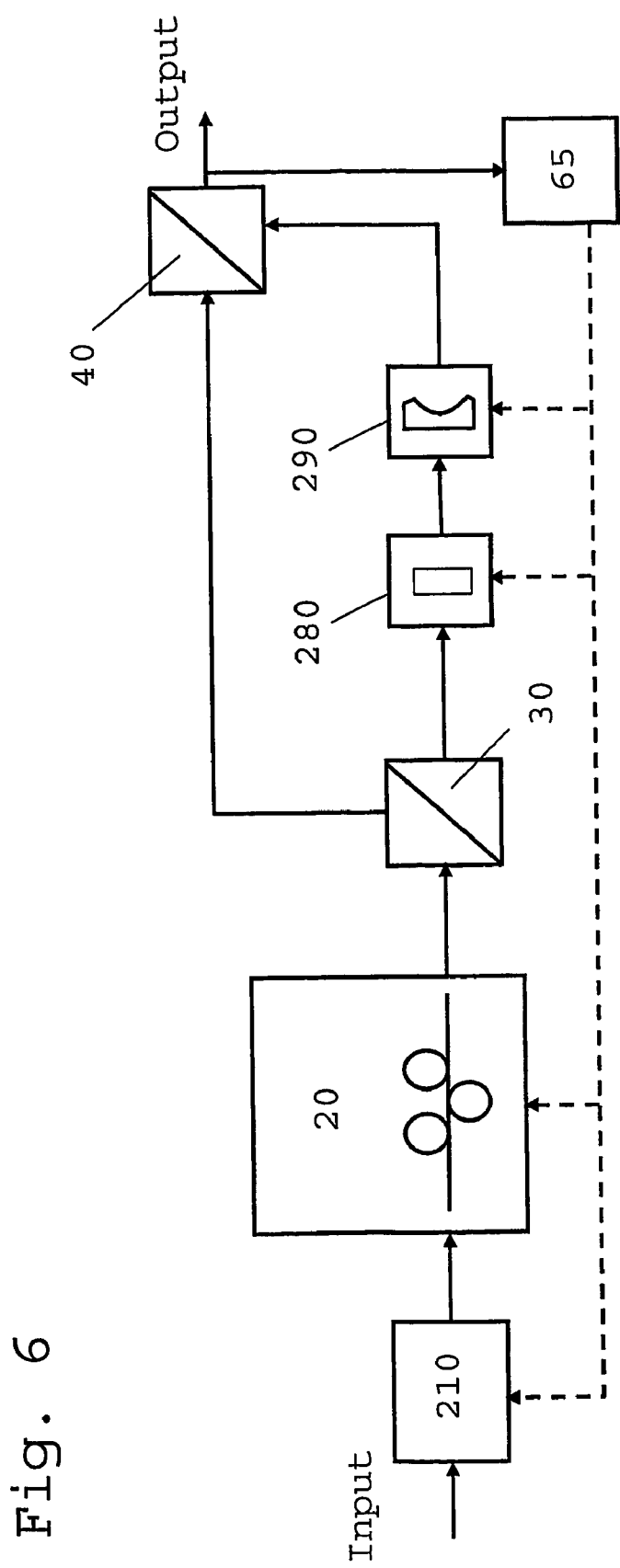

The compensator of FIG. 6 is identical to that of FIG. 5, except that AWG 70 is replaced by two separate elements. Group-delay device 280 is a simple silica block having an thermo-optically adjustable path length. Wavelength-delay device 290 is an AWG like that of FIG. 2, but without rectangular active region 110 (the function of which is in this case taken over by group-delay device 280). Devices 280 and 290 are separately adjusted according to feedback from monitor 65.

Figure 7:
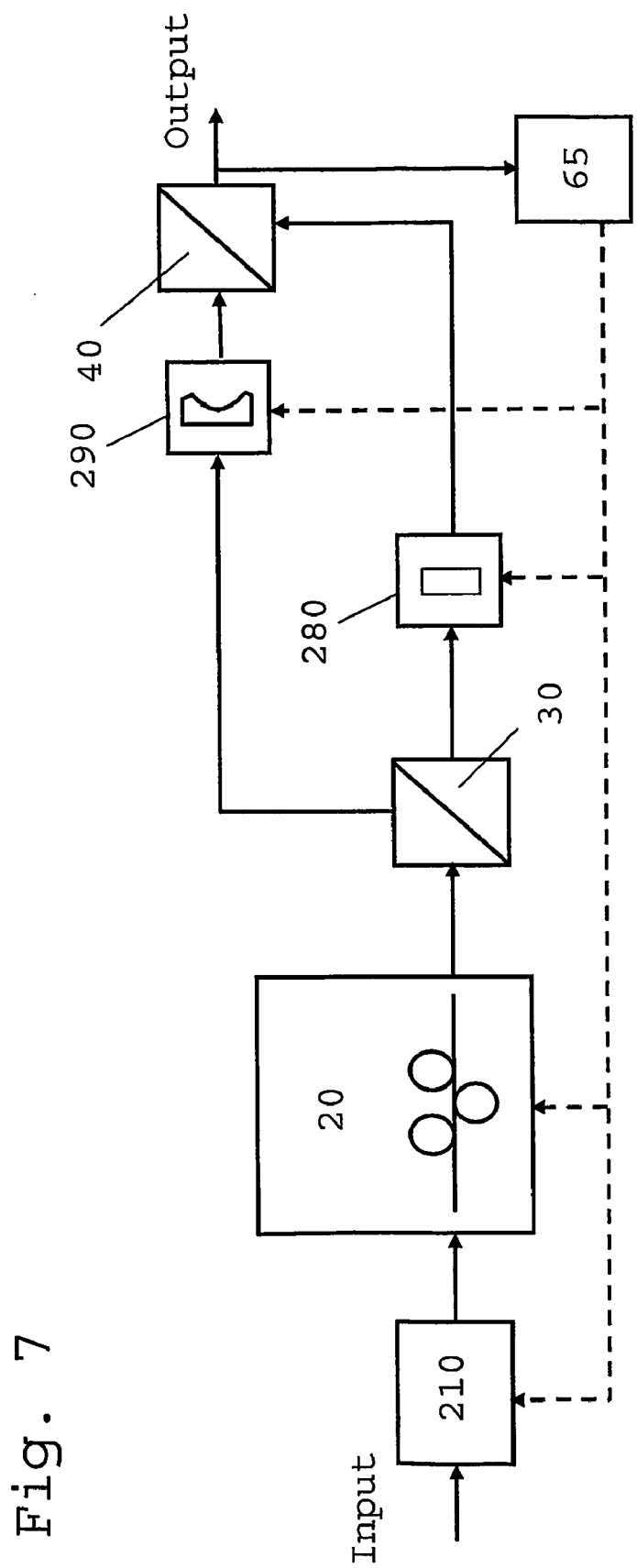

The compensator of FIG. 7 is identical to that of FIG. 6, except that AWG 290 is in the other arm from group-delay device 280. Group-delay compensation and chromatic dispersion compensation are thus achieved in separate arms of the compensator rather than in the same arm. Again, the group-delay compensation is such that the two polarisation components are brought together at the combiner 40; it does not matter in which arm the delay is actively adjusted, so long as the faster component is slowed (or, equivalently, the slower component is sped up) so that the slower component can catch up.

Figure 8:
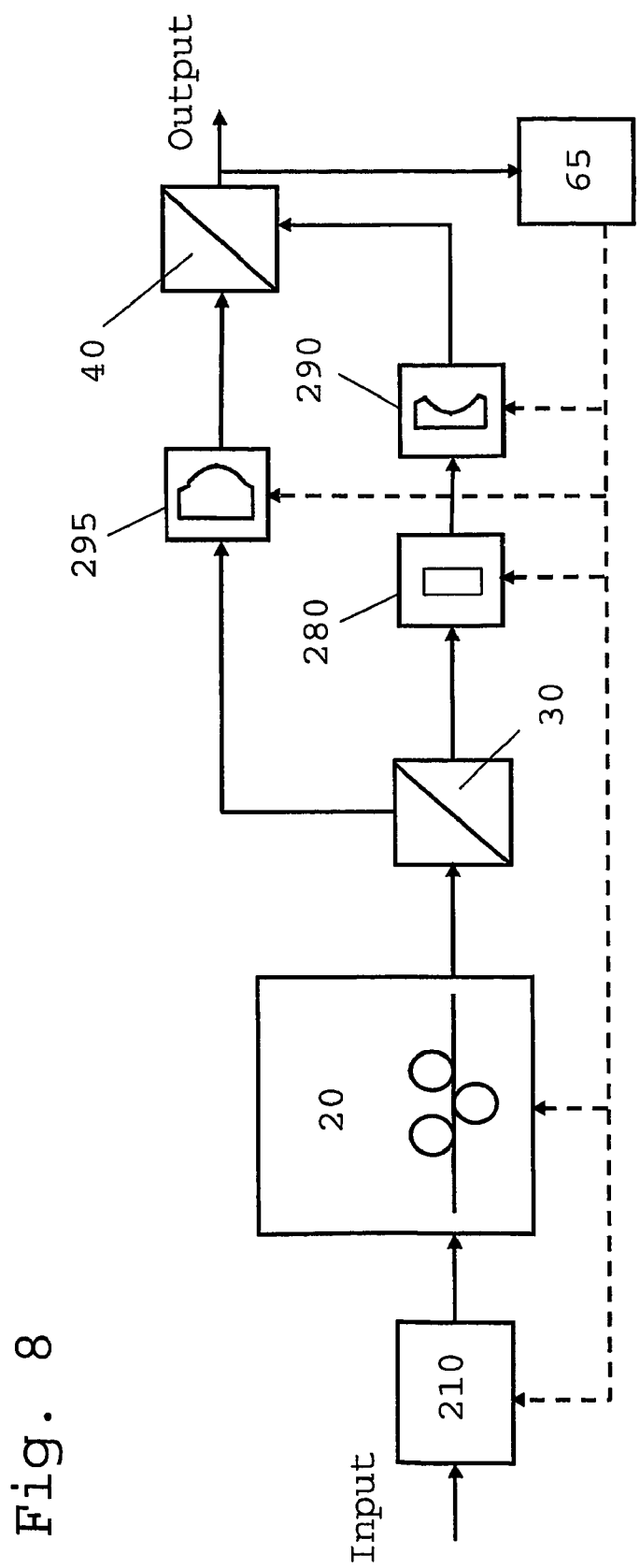

The compensator of FIG. 8 is identical to that of FIG. 6, except that it comprises a further wavelength-delay device 295. In this embodiment devices 290 and 295 are again AWGs, but other elements such as a polynomially chirped-fibre Bragg grating could alternatively be used.

As discussed above, pulses passing through controller 20 and splitter 30 split into two components that are chromatically dispersed by the process. The chromatic dispersion of each of the two components are in opposite senses; that is achieved by appropriate adjustment of DCM 210.

In the embodiments discussed previously, the negatively dispersed component is not compensated for. In the embodiment of FIG. 8, AWG 295 provides a quadratic phase shift of opposite sign to that of AWG 290; thus AWG 295 provides compensation to the negatively chirped component (which is directed through it by the beam splitter 30). The phase shift applied is again altered in response to feedback from monitor 65. By appropriately adjusting the DCM 210 second-order chromatic dispersion components of the same magnitude but opposite signs can occur in the two arms and can therefore be compensated for by devices 290, 295. The compensator of FIG. 8 thus allows more complete compensation of the 2nd-order chromatic dispersion resulting from polarisation-mode dispersion.

It should be noted that, in the above-described embodiments of the invention, the AWG is acting as a compensator on only one wavelength channel (AWGs are often used to perform operations on multiple channels simultaneously).

Figure 9:
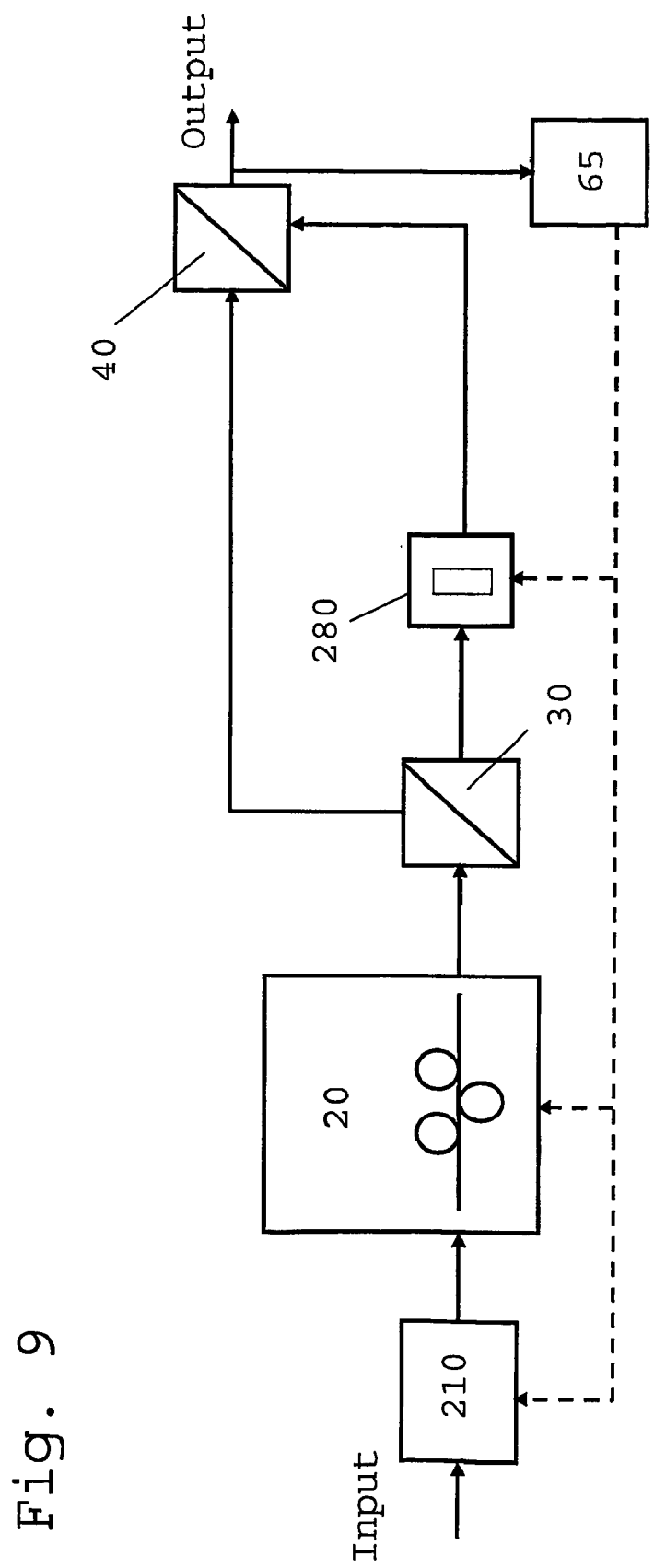

As discussed above, negative chromatic dispersion need not always be compensated, because its effects can often be tolerated in optical communications systems. In the embodiment of FIG. 9, dispersion compensation module 210, which is upstream of the polarisation controller and beam-splitter, is actively adjusted in response to a signal from monitor 65 to compensate for the positive polarisation-mode chromatic dispersion. Although that dispersion most clearly manifests itself in one arm of the compensator (after the beam-splitter has separated the polarisation components), the feedback loop from monitor 65 ensures that the compensation provided by DCM 210 is optimised for compensation of that polarisation component. The compensation provided will thus be slightly more negative than would be expected if the feedback was taken from a point prior to the beam-splitter 30. The negative dispersion of the second polarisation component will therefore be slightly increased, but that is often tolerable. In an alternative embodiment, a positively dispersive active wavelength-delay device is provided in the arm in which the component is negatively dispersed (in a similar arrangement to FIGS. 6 and 7).

A group-delay device 280 is provided in one of the arms of the compensator between beam-splitters 30 and 40. As in the other embodiments, the group-delay is actively adjusted in response to changes in the phase properties of the light monitored at monitor 65.

High-order PMD trajectories on the Poincaré sphere surface can also be understood using coupled-mode theory. A Fourier transform (FT) basis suggests a scaleable filter method that enables compensation of all PMD orders on both a static and dynamic basis. As discussed above, PMD is caused by energy coupling between the two non-degenerate polarisation modes of standard single-mode fibre (SMF). Hence it can be analysed using coupled-mode theory. Using the notation of Yariv (A. Yariv, P. Yeh, "Optical waves in crystals", Chapters 5 & 6, John Wiley & Sons, 1984), we write:

$$\partial_z P_1 = -j\kappa(z) P_2 e^{j\Delta\beta z} \quad (9)$$

$$\partial_z P_2 = -j\kappa^*(z) P_1 e^{-j\Delta\beta z} \quad (10)$$

where $P_1$ and $P_2$ are the electric field amplitudes in the two local principle states of polarisation (PSPs), z is the longitudinal coordinate, $\Delta\beta = \beta_1 - \beta_2$ is the difference between the propagation constants associated with each of the PSPs, where $\beta_{1,2} = 2\pi n_{1,2}/\lambda$ and $n_{1,2}$ are the local refractive indices associated with each of the PSPs.

Since the PMD coupling is considered weak, we can employ the first Born approximation to the solution of the coupled-mode equations to yield the scattering probability for coupling between modes 1 and 2:

$$\rho_{1,2} = -j \int_{-\infty}^{\infty} \kappa^*(z) e^{-j\Delta\beta z} dz \quad (11)$$

The evolution of coupling coefficient $\kappa(z)$ along the length of the SMF follows a random walk. This stochastic property is preserved by the Fourier integral of (11), to yield an equivalent random walk in the spectral domain.

Scattering amplitude between modes 2 and 1 is $\rho_{2,1} = -\rho^*_{1,2}$, whilst the probability of no scattering (i.e. polarisation maintenance) is given from $|\tau| = \sqrt{1-|\rho|^2}$. With no losses or polarisation-dependent loss (PDL) assumed, we can write the unitary frequency-dependent scattering matrix as:

$$\begin{bmatrix} P_1 \\ P_2 \end{bmatrix}_{out} = \begin{bmatrix} \tau(\omega) & \rho(\omega) \\ -\rho^*(\omega) & \tau^*(\omega) \end{bmatrix} \begin{bmatrix} P_1 \\ P_2 \end{bmatrix}_{in} \quad (12)$$

Given that the input signal of carrier frequency $\omega_0$ is aligned to the SMF PSP at that frequency, then we have that $$[P_1(\omega_0) P_2(\omega_0)]_{in}^T = [1\ 0]^T,$$

and hence $$[P_1(\omega) P_2(\omega)]_{out}^T = [\tau(\omega) - \rho^*(\omega)]^T$$

As discussed above, for a fixed intensity, an elliptical state of polarisation (SOP) is a unique point on the surface of the Poincaré sphere. The point is described by two spherical angular coordinates: $\delta$ the ellipticity, and $\chi$ the orientation of the ellipse. As discussed above, higher-order PMD is characterised by trajectories on the surface of the Poincaré sphere, which, of course, describe the variation with angular frequency of ellipticity and orientation of the SOP, $\delta(\omega)$ and $\chi(\omega)$ respectively. As discussed, using a polarisation controller it is possible to align the output PSP of the SMF, defined at the carrier frequency $\omega_0$, to that of a polarising beam splitter (PBS), whose orientation is $\chi = 0$.

When an arbitrary polarisation is passed through a PBS, if the orientation is aligned to that of the PBS (i.e. $\chi(\omega_0) = 0$), then the elliptical polarisation is simply resolved into its component major and minor axis amplitudes, $a_1$ and $a_2$. However, the ellipticity angle $\delta$ is conserved between the two linearly-polarised components, and manifests itself as an appropriate complex exponential phase. The electric fields in the orthogonal PSPs, $P_1$ and $P_2$, are directed respectively into the two arms of the Mach-Zehnder interferometer (MZI) formed by two PBSs. When the trajectory of the depolarisation is such that $\chi$ varies with frequency and is no longer necessarily zero, then the amplitudes of the Jones matrix elements are modified and given at frequency $\omega$ by:

$$P_1(\omega)_{out} = \begin{bmatrix} a_1(\omega) \\ a_2(\omega) \end{bmatrix} e^{j\delta(\omega)/2}, \quad (13a)$$

$$P_2(\omega)_{out} = \begin{bmatrix} -a_1(\omega) \\ a_2(\omega) \end{bmatrix} e^{-j\delta(\omega)/2} \quad (13b)$$

For the special case of $\omega = \omega_0$, for which the PBS orientation is aligned to $\chi = 0$, we must have $$a_1(\omega_0) e^{j\delta(\omega_0)/2} = \tau(\omega_0) \text{ and } a_2(\omega_0) e^{-j\delta(\omega_0)/2} = \rho^*(\omega_0).$$

Thus the PBS acts to convert an arbitrary polarisation into two linear polarisations each with a conjugate phase change. However, from filter theory, it is the phase response (i.e. variation of phase with frequency) which determines the dispersion characteristic. A linear phase response corresponds to a uniform group delay for all frequencies, but any departure from linearity manifests itself as multi-order chromatic dispersion. Thus the group-delay $\Delta\tau_0$ between the two PSPs, and their respective second-order chromatic dispersions D are given by G. Lenz, B. J. Eggleton, C. K. Madsen, C. R. Giles and G. Nykolak, "Optimal dispersion of optical filters for WDM systems", IEEE Photonics Technology Letters, Vol. 10, no. 4, pp. 567–569, 1998:

$$\Delta\tau_0 = -\frac{\partial \delta(\omega)}{\partial \omega} \quad (14a)$$

$$D = -\frac{\partial^2 \delta(\omega)}{\partial \omega^2} \quad (14b)$$

Group-delays of $+\Delta\tau_0/2$ and $-\Delta\tau_0/2$ appear in the respective arms of the MZI, and can be considered to be the first-order PMD, DGD–1; and simply compensated by a single delay line of magnitude $\Delta\tau_0$ in one of the arms. Conjugated second- and higher-order chromatic dispersions appear in each of the arms of $\pm D/2$ and $\pm S/2$, respectively. These can be considered to be the second-order and higher-order PMD terms.

For each PSP, the two arms of the MZI may thus separately compensate for the delay and higher-order dispersions, and the second PBS brings them together, to yield a superposed compensated signal. $\chi(\omega)$ simply manifests itself as a delay and chromatic dispersion (with higher-orders) common to both arms of the MZI, essentially independent of polarisation. The delay can be ignored, whilst the chromatic dispersion associated with $\partial^2 \chi(\omega)/\partial \omega^2$ can be compensated via a feedback loop to the dispersion compensation module (DCM) immediately before the polarisation controller. The DCM is essentially there to compensate the material dispersion of the SMF link. However, by increasing the dispersion of the DCM by a further $+D/2$, second-order PMD can be compensated by a single active dispersion compensator of magnitude $-D$ in only one of the arms (as discussed above in relation to the embodiment of FIG. 9).

Higher-order dispersions (without a common compensator before the MZI) require phase-conjugated dispersion compensators for full compensation. Optical lattice filters would be ideal candidates for this type of application.

Thus, we have described a complete FT model for PMD effects using the first Born approximation technique for solution of the coupled-mode equations. Not only does it allow PMD effects to be modelled by standard signal theory, but appropriate mitigating filter designs can also be synthesised. In addition, we have shown how polarisation trajectories on the Poincaré sphere surface due to PMD effects can be understood from coupled-mode theory.

Figure 10:
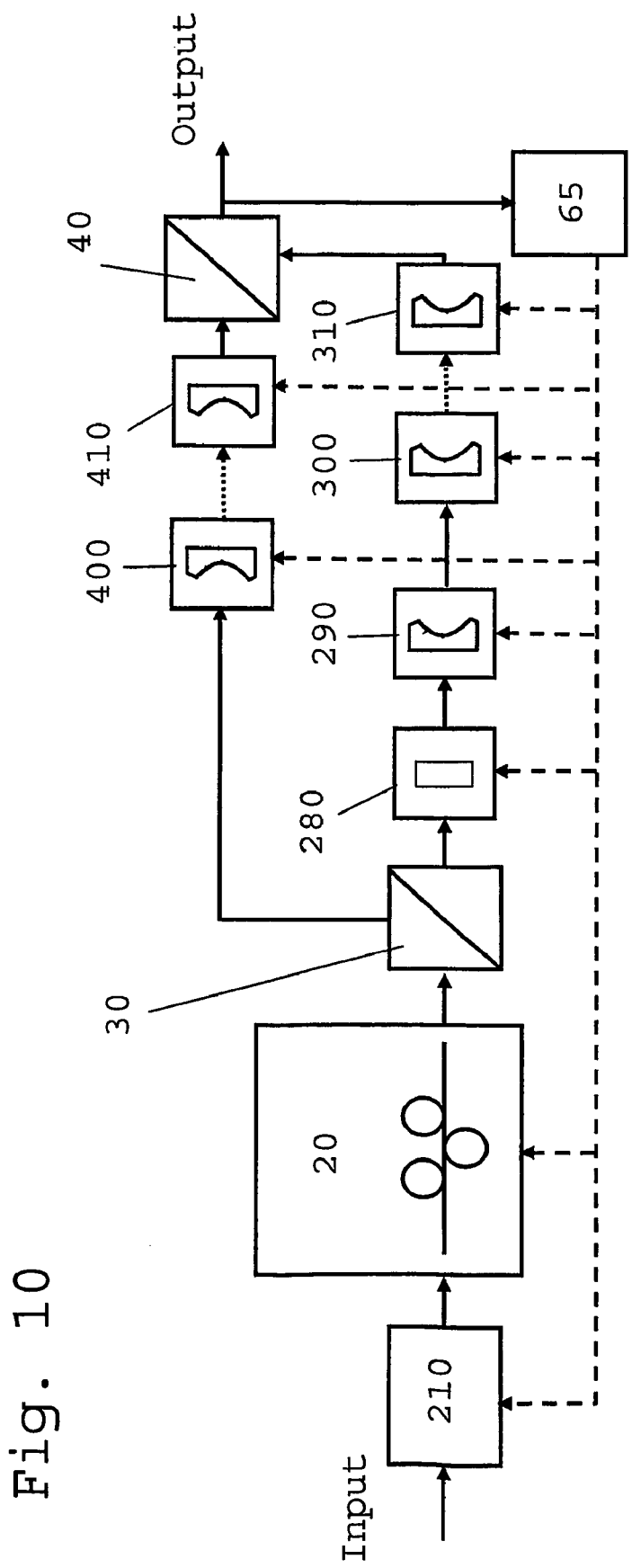

FIG. 10 shows a compensator including (n–2) pairs of further dispersive elements (in the form of further AWGs) which provide third-order to nth order chromatic dispersion (only third-order-compensating AWGs 300, 400 and nth-order-compensating AWGs 310, 410 are shown in the figure). In this embodiment, group delay device 280 compensates for group delay $$\frac{\partial \delta(\omega)}{\partial \omega},$$

device 290 compensates for second-order term $$\frac{\partial \delta^2(\omega)}{\partial \omega^2},$$

device 300 compensates for third-order term $$\frac{1}{2}\frac{\partial \delta^3(\omega)}{\partial \omega^3}$$

and device 310 compensates for nth-order term $$\frac{1}{2}\frac{\partial \delta^n(\omega)}{\partial \omega^n}.$$

For each order above second, phase-conjugated dispersion compensators are provided in the upper arm of the interferometers; AWG 400 is thus a phase-conjugated pair with AWG 300 and AWG 410 with AWG 310, for example.

Thus whilst AWG 290 is sufficient to compensate at least partially second-order chromatic dispersion arising from second-order PMD, provision of (n–2) further AWGs 300 to 310 (together with their phase-conjugated portions 400 to 410) enables compensation of all orders of chromatic dispersion up to nth order, which in turn enables active correction of chromatic dispersion effects arising from third- or higher-order PMD.

Further AWG pairs 400 to 410 may of course be incorporated into other interferometer arrangements, such as those shown in FIGS. 3 and 5 to 9.

In a further alternative embodiment, the higher-orders of chromatic dispersion may be provided by a single device, in an arrangement similar to that of FIG. 8, with components 290, 295 having an appropriate polynomial chirp.

If DCM 210 is arranged to provide active compensation of higher-order chromatic dispersion, one of each pair of compensators 400 to 410 may be dispensed with and its effect provided instead by an appropriate change in the higher-order dispersions provided by the DCM.

We have shown that first- and higher-order polarization-mode dispersion effects can be effectively mitigated by means of a single active arrayed-waveguide grating featuring dynamic group delay and chirp control. A pair of such gratings can offer improved performance. The millisecond response of the device offers improved robustness in dealing with PMD variance as well as mean tendency. As the compensator could be fabricated on a single substrate, it offers opportunities for performance improvements within Metro as well as optical transport networks.

The invention claimed is:

1. A compensator for compensating polarisation-mode dispersion, comprising: a splitter arranged to split light, according to the light's polarisation, between a first optical path and a second optical path; a combiner arranged to combine light from the first optical path and the second optical path, and a monitor for monitoring the light; characterised in that the apparatus comprises an active wavelength-delay device arranged in the first optical path such that components of the light travelling in the first optical path and having different wavelengths are subjected to different delays, the delays being selected according to an output from the monitor, wherein the active wavelength-delay device comprises an active region of an arrayed-waveguide grating (AWG).

2. A compensator as claimed in claim 1, in which the active wavelength-delay device is arranged to compensate for chromatic dispersion due to second-order polarisation-mode dispersion.

3. A compensator as claimed in claim 2, in which the group delay is dependent upon an output from the monitor.

4. A compensator as claimed in claim 1, further comprising an active group-delay device arranged in the first or second optical path, wherein the active group-delay device provides a group delay to light passing along the first or second optical path relative to light passing along the other of the first and second optical paths.

5. A compensator as claimed in claim 4, which is arranged to compensate actively, using the group-delay device, for first-order polarisation-mode dispersion and group delays due to second-order polarisation-mode dispersion.

6. A compensator as claimed in claim 1, in which the active wavelength-delay device is arranged so that the components having the different wavelengths are subjected to delays that vary quadratically with wavelength, so that a linear frequency chirp is imparted to the light, the magnitude of the chirp being actively variable.

7. A compensator as claimed in claim 1, in which the AWG comprises a second active region that is the active group delay device.

8. A compensator as claimed in claim 1, in which the compensator further comprises a polarisation controller.

9. A compensator as claimed in claim 1, further comprising a further active wavelength-delay device arranged upstream or downstream of the splitter.

10. A compensator as claimed in claim 9, in which the further active wavelength delay device is arranged to provide wavelength-dependent delays selected according to the output from the monitor.

11. A compensator as claimed in claim 1, further comprising an active wavelength-delay device arranged in the second optical path, such that components of the light travelling in the second optical path and having different wavelengths are subjected to different delays.

12. A compensator as claimed in claim 11, in which the wavelength dependent delays are selected according to the output from the monitor.

13. A compensator as claimed in claim 11, in which the active-wavelength-delay devices arranged in the first and second optical paths subject components of light travelling in their respective paths to wavelength-dependent delays having opposite signs.

14. A compensator as claimed in claim 1, further comprising at least one pair of active wavelength-delay devices, one device of each pair being in the first optical path and one in the second optical path, the pair being arranged to compensate third- or higher-order chromatic dispersion due to polarisation mode dispersion.

15. A method of compensating polarisation-mode dispersion in a light signal, comprising inputting the light into a compensator, monitoring an indicator indicative of polarisation-mode dispersion on the light, directing a first polarised component of the light along a first optical path, directing a second, differently polarised, component of the light along a second optical path and recombining the polarised components from the first and the second optical paths, characterised in that the method includes the step of delaying different wavelengths of the light travelling in the first optical path by different amounts that are dependent upon the monitored indicator, wherein one or more active regions of an arrayed-waveguide grating (AWG) are adjusted to provide the wavelength-dependent delays.

16. A method as claimed in claim 15 that includes the step of introducing a group-delay to the component passing along the first optical path relative to the component passing along the second optical path, the group delay being dependent upon the monitored output.

17. A method as claimed in claim 15 that includes the step of adjusting an active region to provide the group delay of the component passing along the first optical path.

18. A method as claimed in claim 15, further comprising the step of delaying different wavelengths of the light travelling in the second optical path by different amounts that are dependent upon the monitored indicators.

19. A method as claimed in claim 15, in which the one or more active regions are adjusted to provide a delay for compensating second-order chromatic dispersion.

20. A method as claimed in claim 19, that includes the step of adjusting a further pair of active regions, one in the first optical path and one in the second optical path, to provide wavelength-dependent delays for compensating third-or higher-order dispersion.

21. A compensator for compensating polarisation-mode dispersion, comprising: a splitter arranged to split light, according to the light's polarisation, between a first optical path and a second optical path; a combiner arranged to combine light from the first optical path and the second optical path; an active group-delay device, arranged in the first optical path, for delaying the light in the first optical path relative to the light in the second optical path; a monitor for monitoring chromatic polarisation-mode dispersion on the light; and an active wavelength-delay device arranged upstream or downstream of the splitter, components of the light having different wavelengths being subjected to different delays in the active wavelength-delay device, the different delays comprising delays selected to compensate chromatic dispersion in light entering the compensator, characterised in that the different delays further comprise delays selected according to an output from the monitor, wherein the active wavelength-delay device comprises an active region of an arrayed-waveguide grating (AWG).

22. A compensator as claimed in claim 21, in which the monitor is arranged upstream of the splitter.

23. A compensator as claimed in claim 22, in which the monitor is arranged downstream of the combiner.

24. A compensator as claimed in claim 21, in which the active wavelength-delay device is arranged to provide compensation for a positively dispersed signal.

25. A compensator as claimed in claim 21, further comprising a wavelength-delay device, arranged in the first or the second optical path for providing compensation for a negatively dispersed signal.

26. A method of compensating polarisation-mode dispersion in a light signal, comprising: inputting the light into a compensator; splitting the light into a first polarised component and a second, differently polarised, polarised component; directing the first polarised component along a first optical path; directing the second component of the light along a second optical path; delaying the component passing along the first optical path relative to the component passing along the second optical path; recombining the polarised components from the first and the second optical paths; monitoring an indicator indicative of a chromatic-dispersion component of the polarisation-mode dispersion of the light; and delaying different wavelengths of the light, by different amounts, in order to compensate chromatic dispersion of the light that is input into the compensator, wherein one or more active regions of an arrayed-waveguide grating (AWG) are adjusted to provide the wavelength-dependent delays, characterised in that the method further comprises delaying different wavelengths of the light by different amounts in order to compensate the chromatic-dispersion component of the polarisation-mode dispersion of the light indicated by the monitored indicator.

* * * * *